United States Patent
Castillo

(10) Patent No.: US 12,441,390 B2
(45) Date of Patent: Oct. 14, 2025

(54) STEERING CONTROL MEMBER WITH A FIXED HUB AND A NON-CIRCULAR PROFILE

(71) Applicant: GM Global Technology Operations LLC, Detroit, MI (US)

(72) Inventor: Brian V. Castillo, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 847 days.

(21) Appl. No.: 17/725,666

(22) Filed: Apr. 21, 2022

(65) Prior Publication Data

US 2023/0339533 A1    Oct. 26, 2023

(51) Int. Cl.
*B62D 5/00*     (2006.01)
*B62D 1/10*     (2006.01)
*B62D 1/20*     (2006.01)
*B62D 3/02*     (2006.01)

(52) U.S. Cl.
CPC ............. *B62D 5/001* (2013.01); *B62D 1/10* (2013.01); *B62D 1/20* (2013.01); *B62D 3/02* (2013.01)

(58) Field of Classification Search
CPC . B62D 5/001; B62D 1/10; B62D 1/20; B62D 3/02; B62D 1/06; B62D 1/04
See application file for complete search history.

(56) References Cited

U.S. PATENT DOCUMENTS

| | | | | |
|---|---|---|---|---|
| 2,442,288 A | * | 5/1948 | Floria | B62D 1/04 74/552 |
| 7,358,719 B2 | * | 4/2008 | Kondo | G01D 3/08 324/207.25 |
| 7,777,879 B2 | * | 8/2010 | Baxter | G01D 5/3473 356/364 |
| 8,164,327 B2 | * | 4/2012 | Hoskins | B62D 15/021 324/207.2 |
| 9,147,534 B2 | * | 9/2015 | Mohile | B60Q 1/1469 |
| 10,427,705 B2 | * | 10/2019 | Cao | B62D 5/04 |
| 2008/0277178 A1 | * | 11/2008 | Poli | B60R 21/2032 74/552 |
| 2010/0175499 A1 | * | 7/2010 | Thomas | B62D 1/04 74/552 |

FOREIGN PATENT DOCUMENTS

EP          3960585 A1 *  3/2022   ............. B62D 1/105
WO    WO-2006103553 A1 * 10/2006   ........... B60R 16/027

* cited by examiner

*Primary Examiner* — Paul N Dickson
*Assistant Examiner* — Caitlin Anne Miller
(74) *Attorney, Agent, or Firm* — CANTOR COLBURN LLP

(57) ABSTRACT

A steering control including a steering column, a hub fixedly connected to the steering column, and a support member fixedly connected to the hub. The support member has a continuous outer surface including a central point. A steering member is moveably mounted upon the support member and a steering module is mounted in the support member. The steering module converts movement of the steering member relative to the support member into a steering position signal.

20 Claims, 4 Drawing Sheets

STEERING CONTROL MEMBER WITH A FIXED HUB AND A NON-CIRCULAR PROFILE

INTRODUCTION

The subject disclosure relates to the art of vehicles and, more particularly, to a vehicle having a steering control member including a fixed center hub and non-circular profile.

Most private and commercial vehicles include a steering control in the form of a wheel having a rotating center hub and a circular profile. Other vehicles, such as certain racing vehicles with a limited steering requirement may include a steering control with a rotating center hub and a non-circular profile. A top-fuel dragster, for example, requires minimal steering and thus employs a bowtie shaped steering control. The bowtie shape accommodates a smaller cockpit typically found in a dragster.

Modern vehicle designers are incorporating more and more technology into smaller packages, and consumers have come to expect more and more vehicle features. Therefore, there exists a struggle between vehicle size and the incorporation of vehicle technology features. Steering controls, in the form of steering wheels, require a large footprint in the passenger compartment which may impede both visibility of displays and/or other features. The larger footprint may also impede ingress and egress from the vehicle. Space is required for the steering wheel itself, and space is required to manipulate the steering wheel. Manufacturers would welcome steering control technology that requires a smaller footprint both for the control itself as well as space needed to operate the control.

SUMMARY disclosed, in accordance with a non-limiting example, is a steering control including a steering column, a hub fixedly connected to the steering column, and a support member fixedly connected to the hub. The support member has a continuous outer surface including a central point. A steering member is moveably mounted upon the support member and a steering module is mounted in the support member. The steering module converts movement of the steering member relative to the support member into a steering position signal.

In addition to one or more of the features described herein the steering member comprises a continuous belt that rides upon the support member.

In addition to one or more of the features described herein the steering module includes a gear arranged in the hub, the gear being operatively connected to a steering output member.

In addition to one or more of the features described herein the continuous belt includes a plurality of teeth that interface with the gear arranged in the hub, the plurality of teeth translating movement of the continuous belt into rotation of the gear.

In addition to one or more of the features described herein an intermediate gear is operatively connected between the continuous belt and the gear in the hub.

In addition to one or more of the features described herein the steering output member comprises an encoder coupled to the gear, the encoder converting rotation of the gear into a steering signal.

In addition to one or more of the features described herein the steering module includes a first sensor provided on the support member and a second sensor provided on the continuous belt.

In addition to one or more of the features described herein the steering module includes a controller operatively connected to the first sensor and the second sensor, the controller converting a position of the continuous belt relative to the support member into a steering position signal.

In addition to one or more of the features described herein the first sensor comprises a first plurality of sensors arrayed about the support member and the second sensor comprises a second plurality of sensors provided on the continuous belt.

In addition to one or more of the features described herein the hub is radially offset relative to the central point of the support member.

Disclosed in accordance with another non-limiting example is a vehicle including a body and a plurality of wheels supporting the body. At least one of the plurality of wheels being a steerable wheel. A steering control is operatively connected to the steerable wheel. The steering control includes a steering column, a hub fixedly connected to the steering column, and a support member fixedly connected to the hub. The support member has a continuous outer surface having a central point. A steering member is moveably mounted upon the support member and a steering module is mounted in the support member. The steering module converts movement of the steering member relative to the support member into a steering position signal.

In addition to one or more of the features described herein the steering member comprises a continuous belt that rides upon the support member.

In addition to one or more of the features described herein the steering module includes a gear arranged in the hub, the gear being operatively connected to a steering output member.

In addition to one or more of the features described herein the continuous belt includes a plurality of teeth that interface with the gear arranged in the hub, the plurality of teeth translating movement of the continuous belt into rotation of the gear.

In addition to one or more of the features described herein an intermediate gear is operatively connected between the continuous belt and the gear in the hub.

In addition to one or more of the features described herein the steering output member comprises an encoder coupled to the gear, the encoder converting rotation of the gear into a steering signal.

In addition to one or more of the features described herein the steering module includes a first sensor provided on the support member and a second sensor provided on the continuous belt.

In addition to one or more of the features described herein the steering module includes a controller operatively connected to the first sensor and the second sensor, the controller converting a position of the continuous belt relative to the support member into a steering position signal.

In addition to one or more of the features described herein the first sensor comprises a first plurality of sensors arrayed about the support member and the second sensor comprises a second plurality of sensors provided on the continuous belt.

In addition to one or more of the features described herein the hub is radially offset relative to the central point of the support member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
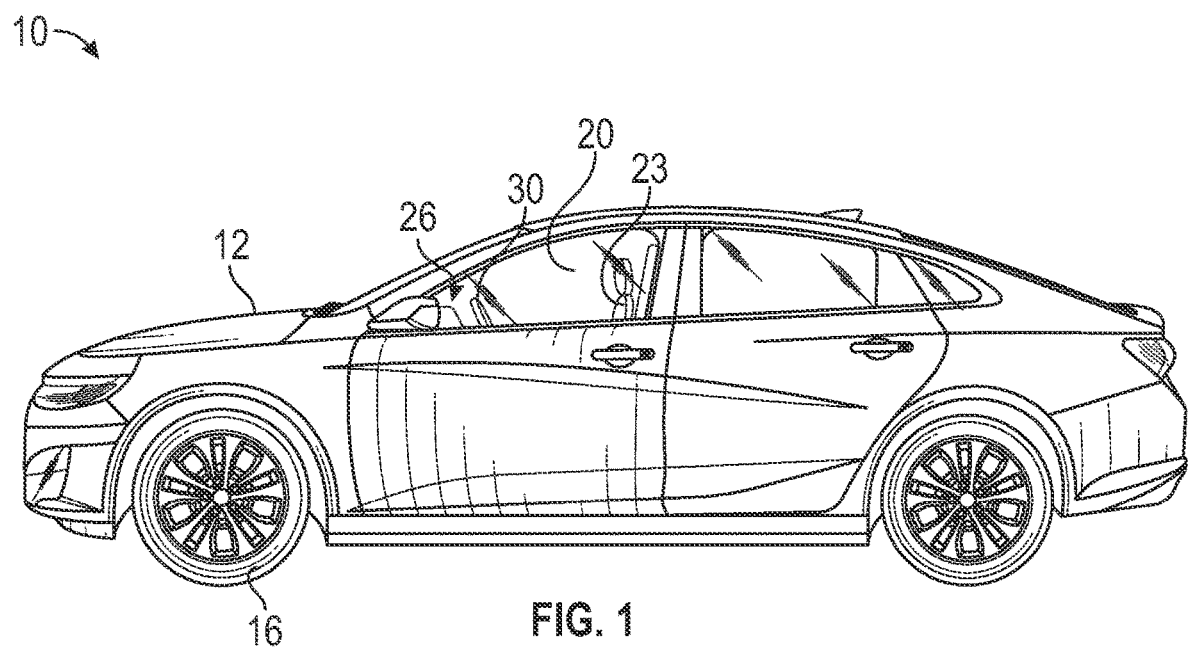
FIG. 1 is a side view of a vehicle including a steering control, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of at least the one of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
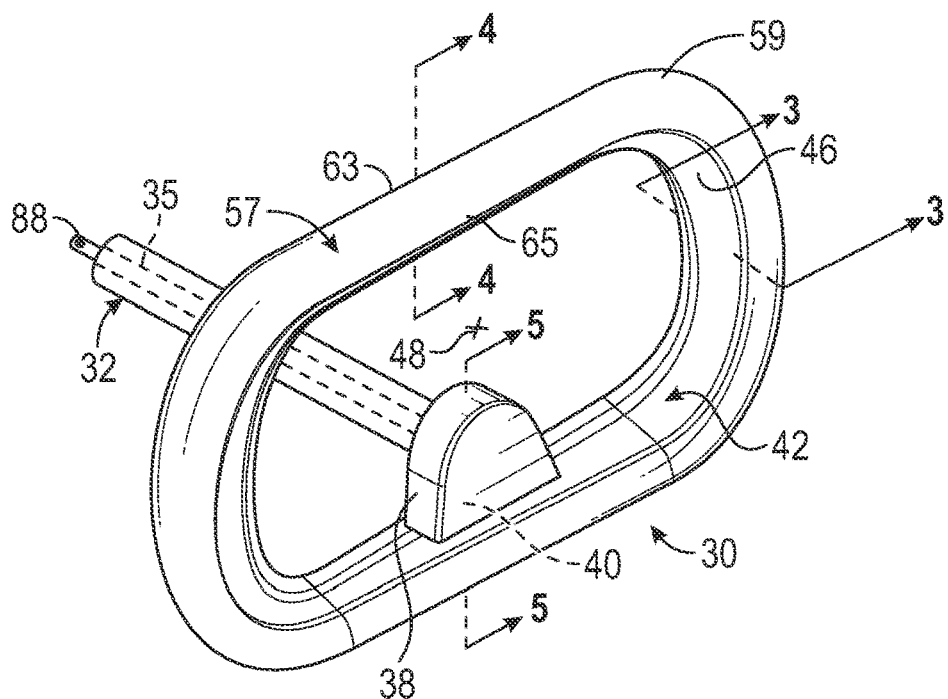
FIG. 2 is a perspective view of the steering control of FIG. 1, in accordance with a non-limiting example.
Figure 5:
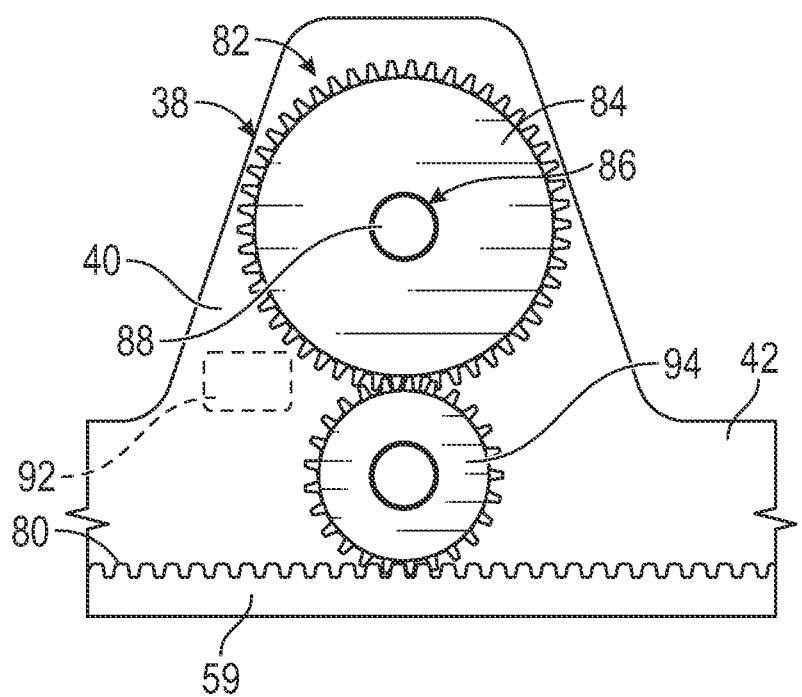
FIG. 5 is a cross-sectional view of the steering control of FIG. 2 taken through the line 5-5.

Referring to FIG. 2 and with continued reference to FIG. 1, steering control 30 is supported by a steering column 32 which, in accordance with a non-limiting example, includes a hollow cross-section that defines a conduit 35. A fixed hub 38 is fixedly attached to steering column 32. Hub 38 may include a hollow interior 40 (FIG. 5). An armature or support member 42 (FIG. 3) is connected to hub 38. Support member 42 includes a continuous outer surface 44 and a continuous inner surface 46 that defines a central point 48. In a non-limiting example, hub 38 is radially offset relative to central point 48.

Figure 3:
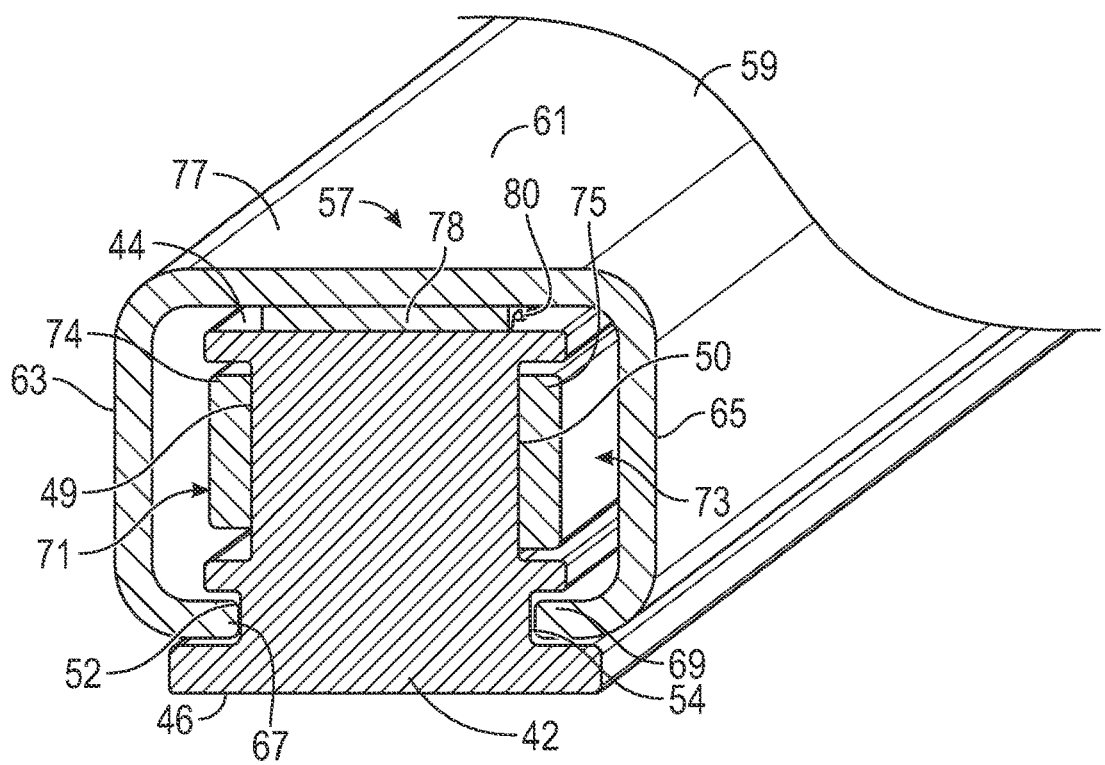
FIG. 3 is a cross-sectional view of the steering control of FIG. 2 taken through the line 3-3.
Figure 4:
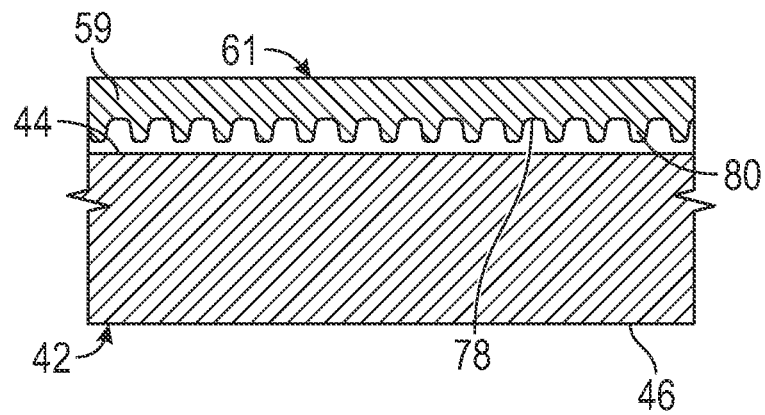
FIG. 4 is a cross-sectional view of the steering control of FIG. 2 taken through the line 4-4.

Referring to FIGS. 3 and 4 and with continued reference to FIG. 2, support member 42 includes a first side surface 49 and a second side surface 50. Second side surface 50 is opposite first side surface 49. In a non-limiting example, first side surface 49 includes a first groove 52 and second side surface includes a second groove 54. First and second grooves 52 and 54 are arranged adjacent to continuous inner surface 46. In a non-limiting example, a steering member 57 extends about support member 42 and rides on continuous outer surface 44.

In a non-limiting example, steering member 57 takes the form of a continuous belt 59 having an outer side portion 61, a first side portion 63, and a second side portion 65 that is opposite first side portion 63. First side portion 63 and second side portion 65 are joined by outer side portion 61. In a non-limiting example, first side portion 63 includes a first edge 67 that rides in first groove 52 and second side portion 65 includes a second edge 69 that rides in second groove 54.

In a non-limiting example, a first friction reducing surface 71 is arranged at first side surface 49 and a second friction reducing surface 73 is arranged at second side surface 50 of support member 42. First friction reducing surface 71 may take the form of a substantially solid smooth member 74 formed from, for example, polytetrafluoroethylene (PTFE), plastic, felt, or lubricated metal. Similarly, second friction reducing surface 73 may be formed from a substantially solid smooth member 75. Of course, first and second friction reducing surfaces may be formed from a variety of materials and/or elements and could include the incorporation of bearings or rollers at first and second side surfaces 49 and 50. In a non-limiting example, first and second friction reducing surfaces 71 and 73 promote movement of steering member 57 about support member 42. In a non-limiting example, outer side portion 61 includes an inner surface section 78. In a non-limiting example, inner surface section 78 includes a plurality of teeth 80. In a non-limiting example, upper surface 44 of support member 42 may include a friction reducing component such as described herein that promotes movement of teeth 80 over support member 42.

In a non-limiting example shown in FIG. 5, steering control 30 includes a steering module 82 that converts movement of continuous belt 59 over support member 42 into a steering command signal that is passed to the steerable wheel(s). In a non-limiting example, steering module 82 includes a gear 84 arranged in hub 38. Gear 84 is connected to a steering output member 86. In one non-limiting example, steering output member 86 may take the form of a shaft 88 (FIG. 1) that extends from hub 38 through steering column 32 to a steering box (not shown). In another non-limiting example, steering output member 86 may take the form of an encoder 92 that translates rotation of gear 84 into an electrical signal that is passed to a steering controller (not shown).

In a non-limiting example, continuous belt 59 is operatively connected to gear 84. In one non-limiting example shown in FIG. 5 an intermediate gear 94 serves as an interface between gear 84 and plurality of teeth 80. However, it should be understood that plurality of teeth 80 may also be directly connected to gear 84. With this arrangement, a driver manipulates continuous belt 59 on support member 42. Movement of continuous belt 59 is transferred to gear 84 via intermediate gear 94. Intermediate gear 94 rotates shaft 88 (FIG. 1) to control the steerable wheel(s). Alternatively, rotation of gear 84 may be read by encoder 92 and then sent to the steering controller.

Figure 6:
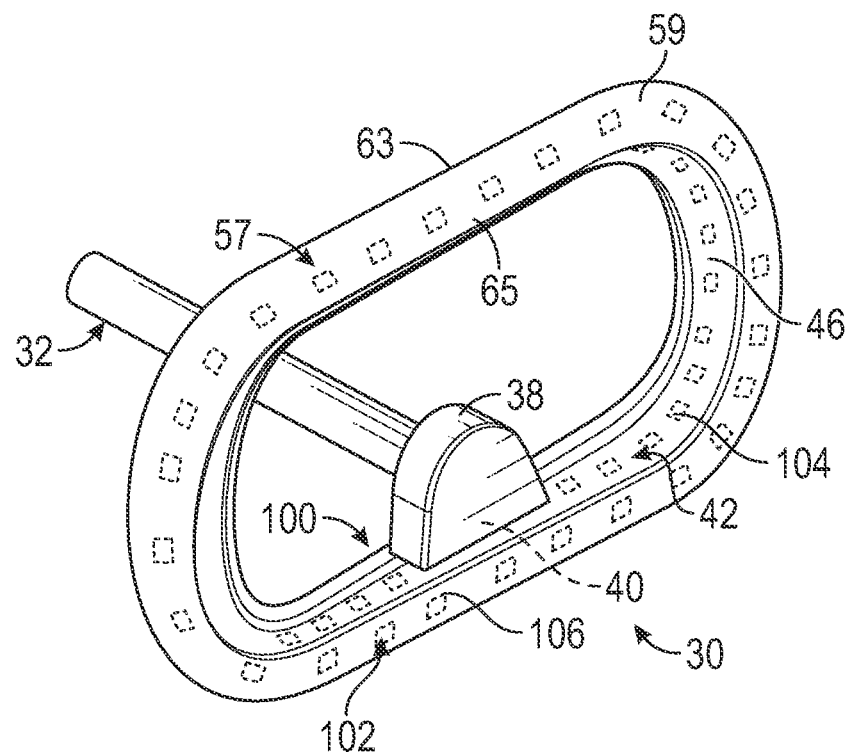
FIG. 6 is a perspective view of the steering control, in accordance with another non-limiting example.
Figure 7:
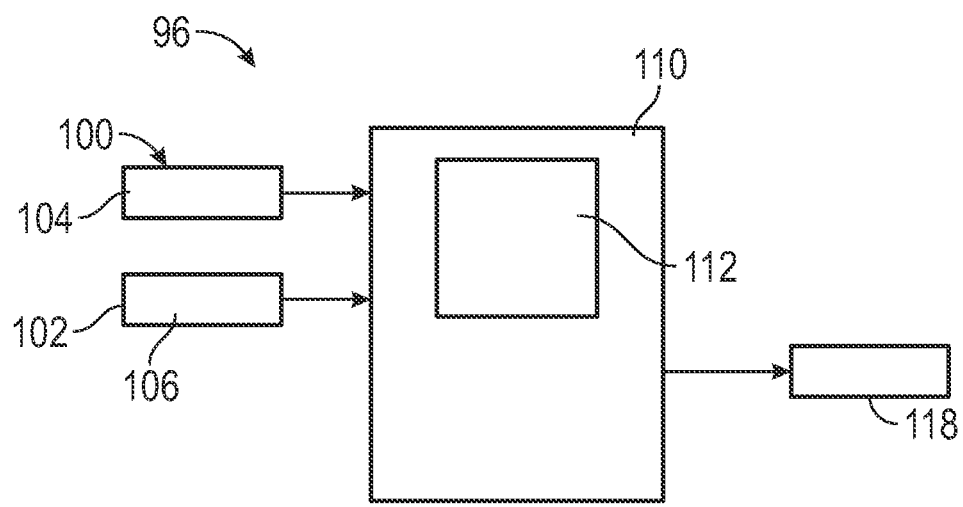
FIG. 7 is a block diagram depicting a steering module, in accordance with a non-limiting example.

Reference will now follow to FIGS. 6 and 7, wherein like reference numbers represent corresponding parts in the respective views, in describing a steering module 96 in accordance with another non-limiting example. In a non-limiting example, steering module 96 includes a sensor 100 arranged on support member 42 and a second sensor 102 connected to continuous belt 59. In a non-limiting example, first sensor 100 may take the form of a first plurality of sensors 104 arranged about support member 42 and second sensor 102 may take the form of a second plurality of sensors 106 arrayed about continuous belt 59.

In a non-limiting example, first plurality of sensors 104 and second plurality of sensors 106 are connected to a controller 110 having a steering signal conversion module 112. Steering signal conversion module 112 converts relative position signals of continuous belt 59 and support member 42 into a steering command 118 that is passed to the steerable wheel. The structure for converting signals from steering conversion module 112 to the steerable wheel may vary and can include all electric control path, mechanical control paths, and hybrid electric and mechanical control paths.

At this point, it should be understood that the present disclosure describes various non-limiting examples of a steering control that possesses a small footprint in the passenger compartment and also is operated with out the need for large hand movements to rotate a wheel. The steering control may include a purely mechanical interface with the vehicle, a purely electrical interface with the vehicle or a hybrid interface with the vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A steering control comprising:
   a steering column;
   a hub fixedly connected to the steering column;
   a support member fixedly connected to the hub, the support member having a continuous outer surface having a central point;
   a steering member moveably mounted upon the support member; and
   a steering module mounted in the support member, the steering module converting movement of the steering member relative to the support member into a steering position signal,
   wherein the steering member is movable within a plane,
   wherein the steering member comprises gear teeth facing directions extending within the plane, and
   wherein the gear teeth are configured to rotate a shaft extending orthogonal to the plane.

2. The steering control according to claim 1, wherein the steering member comprises a continuous belt that rides upon and moves relative to the support member.

3. The steering control according to claim 2, wherein the steering module includes a gear arranged in the hub, the gear being operatively connected to a steering output member that comprises the shaft.

4. The steering control according to claim 3, wherein the gear teeth interface with the gear arranged in the hub, the plurality of teeth translating movement of the continuous belt into rotation of the gear.

5. The steering control according to claim 4, further comprising an intermediate gear operatively connected between the continuous belt and the gear in the hub.

6. The steering control according to claim 3, wherein the steering output member comprises an encoder coupled to the gear, the encoder converting rotation of the gear into a steering signal.

7. The steering control according to claim 2, wherein the steering module includes a first sensor provided on the support member and a second sensor provided on the continuous belt.

8. The steering control according to claim 7, wherein the steering module includes a controller operatively connected to the first sensor and the second sensor, the controller converting a position of the continuous belt relative to the support member into a steering position signal.

9. The steering control according to claim 8, wherein the first sensor comprises a first plurality of sensors arrayed about the support member and the second sensor comprises a second plurality of sensors provided on the continuous belt.

10. The steering control according to claim 1, wherein the hub is radially offset relative to the central point of the support member.

11. A vehicle comprising:
    a body;
    a plurality of wheels supporting the body, at least one of the plurality of wheels being a steerable wheel; and
    a steering control operatively connected to the steerable wheel, the steering control comprising:
    a steering column;
    a hub fixedly connected to the steering column;
    a support member fixedly connected to the hub, the support member having a continuous outer surface having a central point;
    a steering member moveably mounted upon the support member; and
    a steering module mounted in the support member, the steering module converting movement of the steering member relative to the support member into a steering position signal,
    wherein the steering member is movable within a plane,
    wherein the steering member comprises gear teeth facing directions extending within the plane, and
    wherein the gear teeth are configured to rotate a shaft extending orthogonal to the plane.

12. The vehicle according to claim 11, wherein the steering member comprises a continuous belt that rides upon and moves relative to the support member.

13. The vehicle according to claim 12, wherein the steering module includes a gear arranged in the hub, the gear being operatively connected to a steering output member that comprises the shaft.

14. The vehicle according to claim 13, wherein the gear teeth interface with the gear arranged in the hub, the plurality of teeth translating movement of the continuous belt into rotation of the gear.

15. The vehicle according to claim 14, further comprising an intermediate gear operatively connected between the continuous belt and the gear in the hub.

16. The vehicle according to claim 13, wherein the steering output member comprises an encoder coupled to the gear, the encoder converting rotation of the gear into a steering signal.

17. The vehicle according to claim 12, wherein the steering module includes a first sensor provided on the support member and a second sensor provided on the continuous belt.

18. The vehicle according to claim 17, wherein the steering module includes a controller operatively connected to the first sensor and the second sensor, the controller converting a position of the continuous belt relative to the support member into a steering position signal.

19. The vehicle according to claim 18, wherein the first sensor comprises a first plurality of sensors arrayed about the support member and the second sensor comprises a second plurality of sensors provided on the continuous belt.

20. The vehicle according to claim 11, wherein the hub is radially offset relative to the central point of the support member.

* * * * *